United States Patent [19]

Hefter et al.

[11] 4,357,743
[45] Nov. 9, 1982

[54] CONTROLLED DEFLECTION ROLL

[75] Inventors: Josef Hefter, Fenken; Peter Heitmann, Ravensburg-Oberhofen; Christoph Link, Ravensburg; Hans-Joachim Schultz, Ravensburg-Oberhofen; Wolf-Gunter Stotz, Ravensburg; Karl Volz, Baindt, all of Fed. Rep. of Germany

[73] Assignee: Escher Wyss Limited, Zurich, Switzerland

[21] Appl. No.: 223,238

[22] Filed: Jan. 8, 1981

[30] Foreign Application Priority Data

Feb. 5, 1980 [CH] Switzerland ............................ 898/80

[51] Int. Cl.³ ........................ B21B 13/14; B21B 29/00
[52] U.S. Cl. ........................ 29/116 AD; 29/113 AD
[58] Field of Search ......... 29/113 R, 113 AD, 116 R, 29/116 AD; 100/163, 170

[56] References Cited

U.S. PATENT DOCUMENTS

| 3,119,324 | 1/1964 | Justus ........................ 29/116 AD X |
| 3,802,044 | 4/1974 | Spillmann et al. ............ 29/113 AD |
| 4,023,480 | 5/1977 | Biondetti .................... 29/113 AD X |
| 4,074,624 | 2/1978 | Biörnstad et al. ......... 29/116 AD X |
| 4,136,546 | 1/1979 | Lehmann ................... 29/116 AD X |
| 4,154,160 | 5/1979 | Küsters ..................... 29/116 AD X |

Primary Examiner—Eugene F. Desmond
Attorney, Agent, or Firm—Werner W. Kleeman

[57] ABSTRACT

A controlled deflection roll possesses a roll shell which is radially movable in at least one plane in relation to a roll support. Position feelers or sensors are arranged at the ends of the roll shell. These position feelers control regulators operatively associated with pressure or support elements located between the roll support and the roll shell, as a function of deviations from a predetermined reference or set position, in a manner such that the roll shell is maintained in the reference or set position. It is possible to influence the pressure or support elements by the position feelers either equally or unequally, and specifically, with decreasing intensity in the presence of increasing distance from the related position feeler.

15 Claims, 8 Drawing Figures

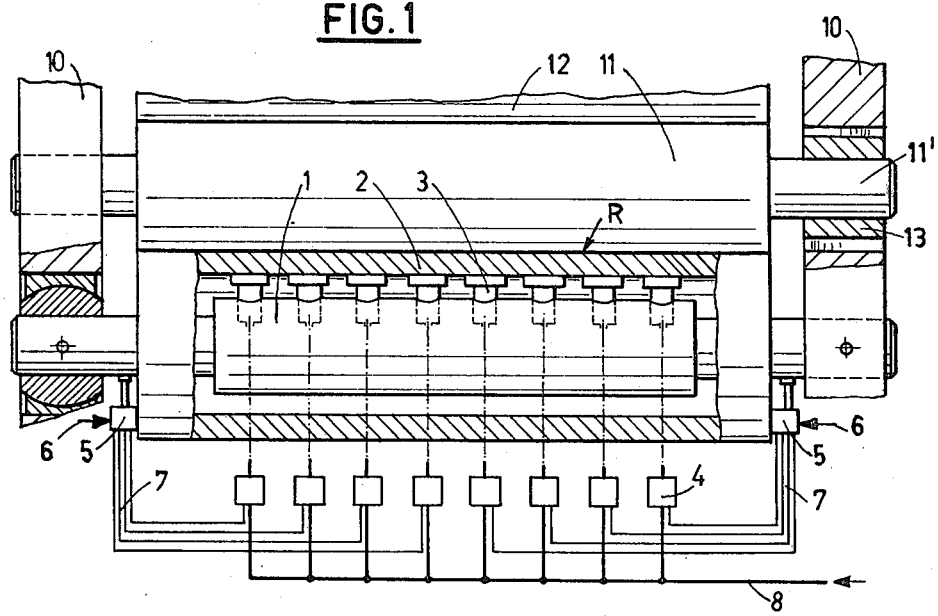
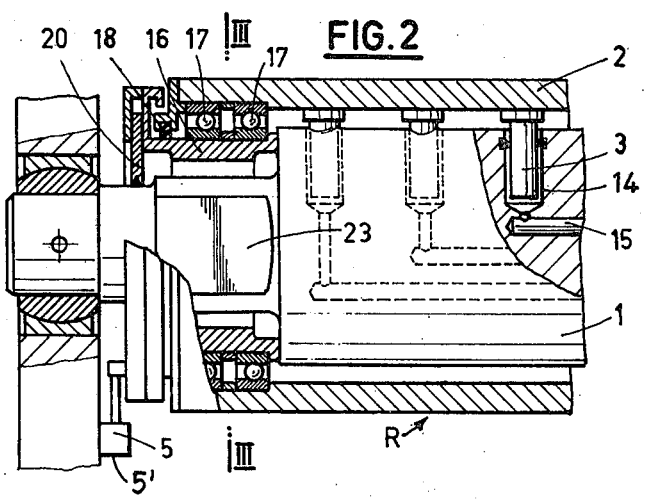
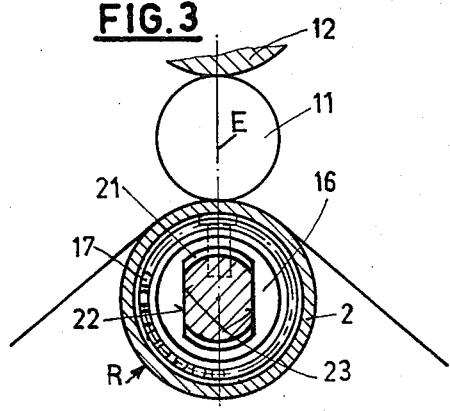
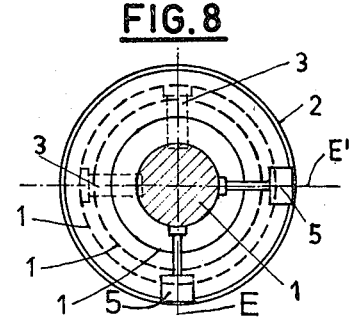

CONTROLLED DEFLECTION ROLL

BACKGROUND OF THE INVENTION

The present invention relates to a new and improved construction of a controlled deflection roll, also referred to as a roll with bending or sag compensation.

Generally, speaking, the controlled deflection roll of the present development is of the type comprising a stationary roll support or core and a roll shell rotatable about the stationary roll support. The roll shell is supported at the roll support by the action of pressure or support elements movable relative to the roll support, bearing at such roll support and effective at the roll shell by exerting a supporting force. The support elements are provided with regulators for influencing their support force.

Controlled deflection rolls of this type are known to the art, for instance, from U.S. Pat. No. 3,802,044, granted Apr. 9, 1974 and U.S. Pat. No. 3,885,283, granted May 27, 1975. With the controlled deflection roll disclosed in the aforementioned U.S. Pat. No. 3,802,044 the roll shell is mounted at its ends at the roll support in roller bearings, whereas in the case of the controlled deflection roll disclosed in the likewise aforementioned U.S. Pat. No. 3,885,283 the roll shell is provided at its ends with guides by means of which the roll shell is movable in relation to the roll support in a press or contact plane where there are effective the support or pressure elements.

If such type of controlled deflection rolls are incorporated into rolling mills, then in the press or pressure-exerting position one of the rolls must assume a fixed position, whereas the other roll or its roll shell must be designed such that it is movable in order to carry out the press or pressure-exerting movements. It is possible for the roll shells of both rolls to act directly upon one another, or there can be arranged between both such rolls a further roll which, as a rule, is usually constituted by a solid roll.

If there are employed rolls having a roll shell rotatably mounted at the roll support, for instance of the type disclosed in U.S. Pat. No. 3,802,044, then there exists the problem that the forces effective at the bearing arrangements, i.e. in the roller bearings located between the roll shell and the roll support, are extremely difficult to determine. There are known from U.S. Pat. No. 4,023,480, granted May 17, 1977 and the Austrian Pat. No. 354,143 analagous devices by means of which it is possible to approximately determine these forces. However, it is not possible to determine with such equipment hysteresis forces and dynamic forces which can assume considerable values.

SUMMARY OF THE INVENTION

Therefore with the foregoing in mind it is a primary object of the present invention to provide a new and improved construction of a controlled deflection roll of the previously mentioned type which is not associated with the aforementioned drawbacks and limitations of the prior art constructions.

Another and more specific object of the present invention aims at providing a new and improved construction of a controlled deflection roll of the previously mentioned type which can be employed as a fixed or stationary roll and possesses a roll shell which can be maintained in a given position, but nonetheless allows for a static faultless determination of the forces effective at the roll shell.

Now in order to implement these and still further objects of the invention, which will become more readily apparent as the description proceeds, the controlled deflection roll of the present development is manifested by the features that the ends of the roll shell are provided with position feelers or sensors for determining the position of the roll shell in relation to the roll support and its deviation from a given reference or set position. These position feelers influence the regulators of the support or pressure elements as a function of the deviation in such a manner that the roll shell is retained by the support elements at the region of the reference position.

With the inventive controlled deflection roll there is dispensed with the supporting of the roll shell at its ends and rendering such movable, in relation to the roll support, in at least one radial direction. The fixation of the roll shell in its given position is accomplished by influencing the support force of the support or pressure elements.

According to a particularly simple construction each position feeler can be connected with the regulator of at least one support element located at its side of the controlled deflection roll or a group of support elements and can influence such.

In the case of a number of regulators of the associated support or pressure elements and which are influenced in each case by a position feeler such regulators all can be influenced in the same manner.

Preferably, however in the case of a number of regulators operatively associated with a position feeler the regulators can be unequally influenced or affected, and specifically in such a manner that the changes of the support force of the support elements or groups of support elements, associated with a given deviation from the reference or set position of a position feeler decreases with increasing spacing of the support elements from the related end of the controlled deflection roll. In this way there is realised an advantageous course of the stress forces in the roll shell in relation to the preceeding case.

Preferably, the operating ranges of the position feelers can mutually overlap in such a manner that regulators of the support elements or groups of support elements at the right half of the controlled deflection roll are overlapingly influenced by the position feelers at the left end of the controlled deflection roll and regulators of the support elements or groups of support elements of the left half of the controlled deflection roll are overlapingly influenced by the position feelers at the right end of the roll shell. This is specifically carried out in such a manner that each position feeler influences the regulators of all support elements or groups of support elements with the exception of the furthest located support element or the furthest group of support elements, and particularly, with decreasing intensity as a function of their increasing spacing from the end of the controlled deflection roll at which there is located the relevant position feeler or sensor. In this manner there is obtained an optimum course of the bending stresses in the roll shell, and the influence of the pressure forces of the individual support elements or groups of support elements is carried out by the related position feeler in accordance with the principles of the law of levers.

The support or pressure elements, in a manner disclosed in the aforementioned U.S. Pat. No. 3,802,044, can be constructed in the form of hydrostatic pistons or punches and be subjected to the influence of a hydraulic pressurised fluid medium, the pressure of which can be adjusted by hydraulic pressure regulating valves which are under the influence of control signals of the position feelers or sensors.

However, it should be understood that it is within the framework of the invention to use any other design of controlled deflection roll, whether such works hydraulically or also in accordance with another principle.

The support or pressure elements can be effective at the roll support by means of their support forces in a support plane extending through the lengthwise axis of the roll shell. Moreover, the ends of the roll shell can be provided with guides which enable its movement in relation to the roll support in the support plane. Such design is also known from the previously mentioned U.S. Pat. No. 3,885,283.

On the other hand, it is however also possible to arrange the pressure or support elements at the roll support in at least two rows, and such are then effective in two support planes. The roll shell is radially movable in relation to the roll support, and each support plane has operatively associated therewith special feelers at the ends of the roll shell. A controlled deflection roll having a roll shell movable in relation to the roll support in all radial directions is known from U.S. Pat. No. 4,136,546, granted Jan. 30, 1979.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a schematic sectional view of a controlled deflection roll constructed according to the invention and which is incorporated into a rolling mill;

FIG. 2 is a sectional view of the left-hand end region of the controlled deflection roll shown in FIG. 1 illustrating details of the guide arrangement which enables movement of the roll shell in relation to the roll support;

FIG. 3 is a cross-sectional view of the arrangement of FIG. 2, taken substantially along the line III—III thereof and shown on a somewhat smaller scale;

FIG. 8 is a sectional view, similar to the arrangement of FIG. 3, of an alternative embodiment of the invention.

DETAILED DESCRIPTION OF THE PREFERRED EMBODIMENTS

Figure 4:
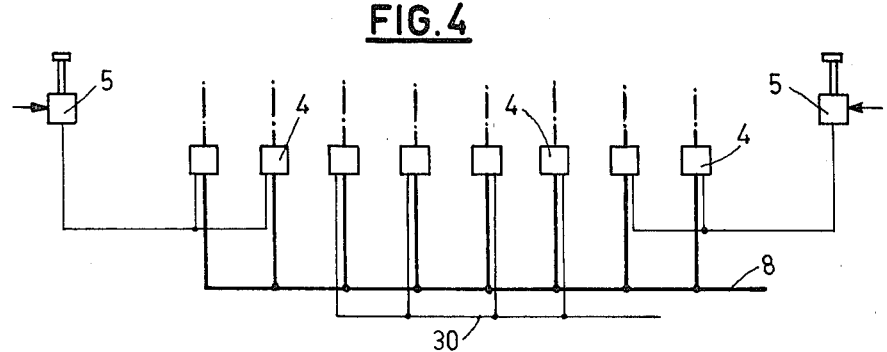
FIG. 4 illustrates a circuit diagram simplified in relation to the illustration of FIG. 1 and serving for influencing the regulators of the support or pressure elements by means of the position feelers or sensors.

Turning attention now to the drawings, it is to be understood that only enough of the construction of a controlled deflection roll has been illustrated therein as will enable those skilled in this art to readily understand the underlying principles and concepts of the present development. Directing attention specifically to FIG. 1, there is shown a controlled deflection roll R having a stationary roll support 1 and a roll shell 2 mounted to be rotatable about the stationary roll support 1. Guided within the stationary roll support 1 are substantially piston-like or punch-like hydrostatic support elements 3, and specifically these support or pressure elements 3 are guided in cylinder bores, such as the bores 14 shown in FIG. 2, to which there is infed a suitable pressurised fluid medium in any appropriate known manner, the pressure of the pressurised fluid medium being governed by standard regulators 4.

At both ends of the roll shell 2 there are arranged between such roll shell 2 and the roll support 1 position feelers or sensors 5, which serve for determining the position of the roll shell 2 in relation to the roll support 1 and their deviation from a given reference or set value 6. The position feelers 5 are connected by signal lines 7 or the like with the regulators 4. These regulators 4 influence the pressure of the pressurised fluid medium, which may be a hydraulic pressurised fluid medium, through the action of not particularly illustrated but conventional throttle valves. This hydraulic pressurised fluid medium is infed from a suitable pressurised fluid medium source through a line 8 to the throttle valves of the regulators 4 and from such regulators then arrive through not particularly shown channels in the roll support 1 (which channels however are indicated by reference character 15 in FIG. 2) at the cylinder bores 14 of the piston-like pressure or support elements 3.

In FIG. 1 there has been indicated the assembly of the inventive controlled deflection roll R in a rolling mill. Thus, the ends of the roll support 1 are pivotably mounted in a frame or frame arrangement 10, but secured against rotation. Coacting with the roll shell 2 of the inventive controlled deflection roll R is a solid counter roll 11 which, in turn, cooperates with a further roll 12.

The bearing journals 11' of the counter roll 11 are rotatably mounted in bearing blocks 13 which can be moved up and down in guides of the frame arrangement 10. The further roll 12 can be a solid roll which is provided with an external contact or pressure-applying mechanism, by means of which this roll 12 can be pressed against the roll 11 and thus against the roll shell 2. However, it also can be constituted by a controlled deflection roll which is similarly constructed as the inventive controlled deflection roll R and, according to the teachings of U.S. Pat. No. 3,885,283, is suitable for the direct generation of a pressing or contact force without any external pressure-applying or contact mechanism.

FIG. 2 illustrates a sectional view through the left-hand end of the controlled deflection roll R shown in FIG. 1 and portrayed on a somewhat larger scale. It will be seen that the piston-like support or pressure elements 3 are reciprocably guided in the cylinder bores 14 which are connected by means of the infeed bores or channels 15 with the related branch of the supply line or conduit 8 for the infeed of the pressurised fluid medium, the pressure of which can be controlled by the related regulator 4.

The bores 15 of the arrangement of FIG. 2 have only been schematically illustrated and not in a manner constituting their actual arrangement in a practical construction of controlled deflection roll. In an actual design of controlled deflection roll the infeed preferably is accomplished by tubes or pipes arranged in a central bore of the roll support 1. Also the pressurised fluid medium is infed at the pressure governed by a regulator usually not to a single support or pressure element 3 rather to a group of adjacently arranged support elements 3 located in a row. Such arrangement and measures are well known however in this technology, for instance as exemplified by the controlled deflection roll disclosed in the aforementioned U.S. Pat. No. 4,023,480. Therefore, conceptually the pressure or support elements 3 of the arrangement of FIG. 1 or that of FIG. 2 can be construed as constituting either individual support elements or an arrangement where a plurality thereof constitute an associated group of support elements which is supplied with the pressurised fluid medium as explained heretofore.

In accordance with the illustration of FIG. 2 the controlled deflection roll R is provided with a bushing 16 at which there is rotatably mounted the roll shell 2 in roller bearings 17 or other suitable anti-friction bearing means. The intermediate space between the bushing 16 and the roll shell 2 and the roll support 1, respectively, is sealed by a suitable sealing ring 18 and a sealing disc 20.

As will be particularly evident by referring to FIG. 3, constituting a sectional view according to the line III—III of FIG. 2, there is formed in the bushing 16 an elongate opening 21 having two essentially parallel guide walls 22. The guide walls 22 coact with likewise parallel guide surfaces 23 of the roll support 1, as likewise best seen by referring to FIG. 2. These guide walls 22 and the guide surfaces 23 enable movements of the roll shell 2 along with the bushing 16 in relation to the roll support 1 in a press or pressure plane E in which there is also disposed the axes of the support or pressure elements 3.

During operation, the forces effective at the roll shell 2 of the controlled deflection roll R are taken-up by the support elements 3 which thus bear by means of the hydraulic pressurised fluid medium upon the roll support 1. The pressure of the hydraulic pressurised fluid medium is influenced by the regulators 4, and specifically, in a manner such that there is maintained the reference position which has been inputted by the reference or set value 6. If, for instance, the ends of the roll shell 2 should be deflected downwardly under the action of the pressure forces effective at the roll shell, then by means of the regulators 4 there is increased the hydraulic pressure of the pressurised fluid medium and thus the supporting force of the pressure or support elements 3. On the other hand, if one of the ends or both ends of the roll shell 2 move upwardly, i.e. overcome counter forces, then the pressure in the related cylinders or cylindrical bores 14 of the pressure or support elements 3 is reduced.

Figure 5:
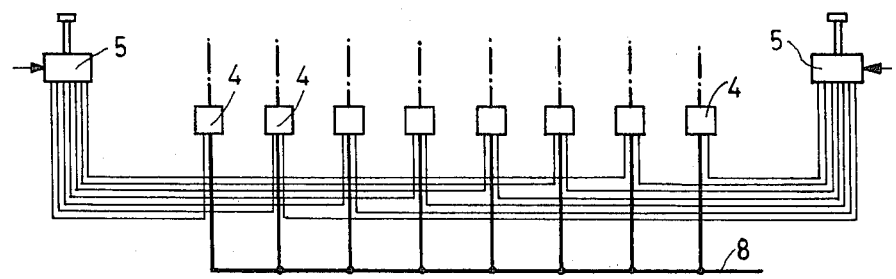
FIG. 5 illustrates a different possibility of designing the circuitry of FIG. 4.

In FIGS. 1, 4 and 5 there have been illustrated different possibilities of influencing the regulators 4 of the support or pressure elements 3.

Hence, with the embodiment of FIG. 1 each position feeler or sensor 5 is operatively associated with the regulators 4 of the roll half confronting such regulators, i.e. the left position feeler or sensor 5 is associated with the four regulators 4 of the left half of the controlled deflection roll, the right position feeler 5 is associated with the four regulators 4 of the right roll half. The influencing operation can be accomplished such that the reference values infed from the position feelers 5 to the individual regulators 4 are equal. However, the operation also can be accomplished in a different way, as will be apparent from the following disclosure, and specifically, preferably with decreasing intensity with increasing distance from the roll end at which there is located the related position feeler.

With the embodiment of FIG. 4 the position feelers 5 in each case influence only the regulators 4 of the outer support elements or groups of support elements 3. Thus, with the arrangement of FIG. 4 the regulators of the intermediate support or pressure elements 3 are not influenced by the position feelers or sensors 5. These regulators 4 can be influenced by their own control lines 30 as a function of the mode of operation of the rolling or roller mill.

With the circuit arrangement of FIG. 5, as to the eight regulators 4, in each case seven such regulators are connected with the position feeler 5 at one side. Consequently, only the regulator 4 operatively associated with the support element furthest away from the position feeler 5 remains unaffected.

Figure 6:
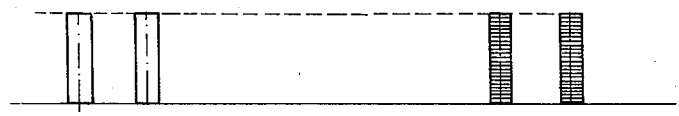
FIG. 6 is a function diagram related to the operation of the circuitry of FIG. 4.
Figure 7:
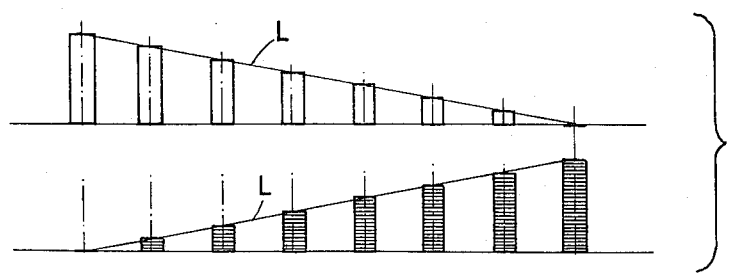
FIG. 7 is a function diagram related to the operation of the circuitry of FIG. 5.

FIGS. 6 and 7 illustrate two possible modes of operation of the position feelers 5 and the regulators 4 with the inventive controlled deflection roll. Thus, in the showing of FIG. 6 influencing of the support force of the support elements 3, associated with the related position feeler 5, always is accomplished in the same manner. In other words, the changes of the force, caused by the position feeler, at the four pressure or support elements 3 and the regulators 4 of one side are the same for the arrangement of FIG. 1 and that of FIG. 4.

In accordance with the illustration of FIG. 7 the regulators 4 and by means of such the support elements 3 are unequally influenced or effected, and specifically with decreasing intensity with increasing distance from the corresponding position feeler 5. With the embodiment of FIG. 7 the dependency is linear, as indicated generally by the straight line L. However, it is to be understood that also other dependencies are possible, for instance, a slight overlapping or also a non-linear course of the lines L.

The position feeler or sensor 5 is assigned the task of determining the position of the roll shell 2 in relation to the roll support 1. For this purpose, and as illustrated in FIG. 1, it can be directly connected with the roll support 1 and the roll shell 2 or its bushing 16, respectively. Such type design has been illustrated in FIG. 1. However, part of the position feeler or sensor 5 can also be connected with a constructional element which is fixedly connected with the roll support 1. Thus, for instance, according to the showing of FIG. 2 the housing 5' of the position feeler 5 can be attached to the frame arrangement 10, whereas its movable portion can be connected with the bushing 16 of the roll shell 2.

In FIG. 8 there is illustrated in schematic sectional view a controlled deflection roll whose roll shell 2 is movable in relation to the roll support 1 in all radial directions. Here there are absent the guide surfaces 22 and 23. Instead, there is provided for the controlled deflection roll two rows of support or pressure elements 3, to which there are operatively associated in suitable fashion also the position feelers 5 which are located in the planes E and E' of the support elements 3. The mode of operation of the support elements 3 and their position feelers 5 in the individual planes E and E' is as described.

With the embodiment of FIGS. 1 to 3 there also can be provided two rows of support or pressure elements 3, whose forces act in the same support plane E, but in opposite sense. They then can determine the location of the roll shell in two different positions.

If the support forces of the support or pressure elements 3 should be effective in the support plane E and E', respectively, then this does not absolutely mean that their axes must lie in such plane E or E', as the case may be. The support elements 3 also can be arranged, for instance, in two rows so as to be substantially V-shaped symmetrical to the plane E. What is only important is that the resultant of their support forces is effective in the support plane E and E', respectively.

As concerns the position feelers or sensors, which are basically known and do not constitute subject matter of the invention, these preferably can be designed in accordance with electromagnetic principles. They also can simply be constructed as hydraulic control slides.

While there are shown and described present preferred embodiments of the invention, it is to be distinctly understood that the invention is not limited thereto, but may be otherwise variously embodied and practiced within the scope of the following claims. Accordingly,

What we claim is:

1. A controlled deflection roll comprising:
   a stationary roll support;
   a roll shell rotatable about said stationary roll support;
   support elements for supporting said roll shell at said roll support;
   said support elements being movable in relation to the roll support, bearing upon said roll support and acting with a support force at the roll shell;
   regulators provided for the support elements for influencing their support force;
   said roll shell having opposed ends;
   position feelers provided for the ends of said roll shell in order to determine the position of the roll shell in relation to the roll support and deviations of the roll shell from a predetermined reference position; and
   said position feelers influencing said regulators of the support elements as a function of the deviation of the position of the roll shell from said predetermined reference position in a manner such that the roll shell is retained by the support elements at the region of the reference position.

2. The controlled deflection roll as defined in claim 1, wherein:
   each position feeler is operatively connected with the regulator of at least one support element located at the related side of the controlled deflection roll and influences such support element.

3. The controlled deflection roll as defined in claim 2, wherein:
   one position feeler influences a number of said regulators of the related support elements; and
   all of said influenced regulators being affected in the same manner.

4. The controlled deflection roll as defined in claim 2, wherein:
   a plurality of the regulators are associated with one of the position feelers;
   said plurality of regulators being unequally influenced such that the changes of the support force of the support elements correlated to a given deviation from the reference position of a position feeler decreases with increasing spacing of the support elements from the related end of the roll shell.

5. The controlled deflection roll as defined in claim 4, wherein:
   operating ranges of the position feelers mutually overlap such that regulators of said support elements located at one-half of the controlled deflection roll are superimposingly influenced by the position feeler located at the one end of the other half of the roll shell and regulators of the support elements located at the other half of the roll shell are superimposingly influenced by the position feeler located at the other end of said one-half of the roll shell.

6. The controlled deflection roll as defined in claim 5, wherein:
   each position feeler influences the regulators of all of the support elements, with the exception of the most distant located support element, with decreasing intensity as a function of their increasing distance from the end of the roll shell at which there is located such position feeler.

7. The controlled deflection roll as defined in claim 1, wherein:
   the support elements each have the shape of a substantially hydrostatic piston and are subjected to the action of a hydraulic pressurised fluid medium; and
   the pressure of the hydraulic pressurised fluid medium being regulatable by pressure regulating valve means defining said regulators and which are exposed to the action of control signals of the position feelers.

8. The controlled deflection roll as defined in claim 1, wherein:
   said support elements are effective at the roll support with their support force in a support plane extending through the lengthwise axis of the roll shell;
   guide means provided for the ends of the roll shell; and
   said guide means enabling movement of the roll shell in relation to the roll support in the support plane.

9. The controlled deflection roll as defined in claim 1, wherein:
   said support elements are arranged at the roll support in at least two rows and are effective in two support planes;
   the roll shell being radially movable in relation to the roll support; and
   each support plane being provided with predetermined ones of said position feelers at the ends of the roll shell 10. The controlled deflection roll as defined in claim 1, wherein:
    each position feeler is operatively connected with the regulator of at least one group of support elements located at the related side of the controlled deflection roll and influences such group of support elements.

11. The controlled deflection roll as defined in claim 10, wherein:
    one position feeler influences a number of said regulators of the related group of support elements; and
    all of said influenced regulators being affected in the same manner.

12. The controlled deflection roll as defined in claim 10, wherein:
    a plurality of the regulators are associated with one of the position feelers; and
    said plurality of regulators being unequally influenced such that the changes of the support force of the group of support elements correlated to a given deviation from the reference position of a position feeler decreases with increasing spacing of the support elements from the related end of the roll shell.

13. The controlled deflection roll as defined in claim 12, wherein:
    operating ranges of the position feelers mutually overlap such that regulators of the group of support elements located at one-half of the controlled deflection roll are superimposingly influenced by the position feeler located at the one end of the other half of the roll shell and regulators of the group of support elements located at the other half of the roll shell are superimposingly influenced by the position feeler located at the other end of said one-half of the roll shell.

14. The controlled deflection roll as defined in claim 13, wherein:
    each position feeler influences the regulators of all groups of the support elements, with the exception of the most distant support element, with decreasing intensity as a function of their increasing distance from the end of the roll shell at which there is located such position feeler.

15. The controlled deflection roll as defined in claim 1, wherein:
    the support elements each have the shape of a substantially hydrostatic punch-like element and are subjected to the action of a hydraulic pressurised fluid medium; and
    the pressure of the hydraulic pressurised fluid medium being regulatable by pressure regulating valve means defining said regulators and which are exposed to the action of control signals of the position feelers.

* * * * *